United States Patent
Rawson, III

(10) Patent No.: US 6,823,397 B2
(45) Date of Patent: Nov. 23, 2004

(54) SIMPLE LIVENESS PROTOCOL USING PROGRAMMABLE NETWORK INTERFACE CARDS

(75) Inventor: Freeman Leigh Rawson, III, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 09/738,578

(22) Filed: Dec. 18, 2000

(65) Prior Publication Data

US 2002/0078187 A1 Jun. 20, 2002

(51) Int. Cl.[7] .............................................. G06F 15/16
(52) U.S. Cl. ..................................... 709/250; 709/222
(58) Field of Search ............................... 709/220–224, 709/227, 228, 250; 370/254–258

(56) References Cited

U.S. PATENT DOCUMENTS

| | | | |
|---|---|---|---|
| 6,282,642 B1 * | 8/2001 | Cromer et al. ................. 713/2 |
| 6,345,294 B1 * | 2/2002 | O'Toole et al. .............. 709/222 |
| 6,370,656 B1 * | 4/2002 | Olarig et al. .................. 714/23 |
| 6,493,716 B1 * | 12/2002 | Azagury et al. .............. 707/10 |
| 6,598,094 B1 * | 7/2003 | Wollrath et al. ............ 719/330 |
| 2002/0052914 A1 * | 5/2002 | Zalewski et al. ........... 709/203 |

* cited by examiner

Primary Examiner—Jeffrey Gaffin
Assistant Examiner—David Martinez
(74) Attorney, Agent, or Firm—Casimer K. Salys; Dillon & Yudell LLP

(57) ABSTRACT

A method and system for determining liveness of targets within a metaserver environment utilizing programmable network interfaces. The network interface has access to the associated target computer's processor and memory. A memory location on the target is allocated to storing an internal liveness parameter. The parameter increases when the computer system is making forward progress or operating. The MetaServer stores an initial parameter value of the target when it activates the target. After a pre-selected period, the network interface of the target accesses the associated memory location and provides the current value of the parameter to the MetaServer. When the now value is larger than the previously stored value, the target is assumed to be live.

24 Claims, 5 Drawing Sheets

SIMPLE LIVENESS PROTOCOL USING PROGRAMMABLE NETWORK INTERFACE CARDS

RELATED APPLICATIONS

The present invention is related to the subject matter of co-pending U.S. patent application Ser. No. 09/735,581 entitled "Programming Network Interface Cards to Perform System and Network Management Functions" filed concurrently herewith.

BACKGROUND OF THE INVENTION

1. Technical Field

The present invention relates in general to clustered computer systems and in particular to management of clustered computer systems. Still more particularly, the present invention relates to a method and system for performing liveness checks within a cluster of thin servers or server appliances utilizing programmable network interface cards.

2. Description of the Related Art

There is a desire within the computer industry to provide more efficient ways to manage a farm or cluster of thin servers or server appliances being utilized for web-based application service as a single system while maintaining multiple execution images.

Currently, server systems that require management often contain service processor cards with a standard microprocessor, local memory, and a standard bus interface. These service processor cards typically have an interface to a specialized management bus located on the server system planar. State-of-the-art examples of service processor cards include the Wiseman card manufactured by International Business Machines for Netfinity and related products, integrated implementations of the same function, and the Emergency Management Processor (EMP) card manufactured by Intel Corporation. Another recent example is the implementation by Intel Corporation of the management bus, baseboard management controller and processor, and emergency management port on the system planar.

Current server systems with a service processor implementation (card or integrated on the planar) contain both a general network interface and the service processor, which, in turn, has a private network interface that is typically a serial one. The network interface card is an input/output (I/O) device, usually attached by an I/O bus to processor and memory, while the service processor is attached not only to the I/O bus but also to a bus such as the Inter-Integrated Circuit ($I^2C$) bus that gives it access to hardware sensor information such as power levels, temperatures, fan speeds and so forth.

Typically, both the network interface card and the service processor are programmable, and since the service processor is connected to the external world through one or more communications interfaces, both have physical network connectors and network hardware and software implementations. Also, the network interface card has to be "awake" enough to respond to wake-on-LAN packets, and the service processor generally supports an interface for powering-up the system. Thus, both require some form of always-active logic and partial power.

When large numbers of thin servers or server appliances are congregated together in a single rack or set of racks to provide critical services such as running web-based applications, they must be managed. In the MetaServer environment, one design goal is to minimize the memory and performance impact of management on the thin servers running the applications by off-loading as much as possible to a management server appliance, referred to hereinas the MetaServer. One of the most important things that a MetaServer must monitor is the liveness of the servers in the MetaServer's environment.

Liveness, in the context of the MetaServer environment, refers to whether all of the elements or systems in the server farm are connected to the network and making forward progress in the processing or data transmission activities. The MetaServer system maintains a current representation of which systems are live and which are not. However, maintaining liveness information for a large number of systems can involve substantial overhead on both the MetaServer and the systems being managed (or targets), and requires the transmission of a large number of packets on the network, which consumes network bandwidth solely for the purposes of monitoring. The more often the MetaServer updates the liveness information about the systems in the server farm, the greater the overhead incurred.

The current state of the art in liveness detection has the operating system images in a cluster of thin servers or server appliances exchange messages called heartbeats. The process is often completed on a special management network although the application network may also be utilized. There have been a few, very specialized interconnection mechanisms that have implemented their own connectivity detection schemes, but these only monitor the interconnection mechanism itself and not the state of the systems attached to the interconnection mechanism.

The present invention recognizes that it would be desirable to provide a simple and low-overhead way of determining liveness within a MetaServer environment. A method and system that utilizes the facilities provided by programmable network interface cards to perform liveness detection without requiring additional hardware is a welcomed improvement. These and other benefits are provided by the present invention.

SUMMARY OF THE INVENTION

Disclosed are a method and system for determining liveness of target managed systems within a MetaServer environment utilizing the function provided by programmable network interfaces included within the targets and the management server appliance or MetaServer. The network interface, whether in card or integrated form, is provided with direct access to the associated target computer's processor and memory. Specifically, one or more memory locations on the target are allocated to store values that indicate the liveness of the system. The parameters selected are ones that increase when the computer system is making forward progress or operating. The MetaServer stores initial parameter values for the target when the target is started. After a pre-selected period, the network interface of the target accesses the associated memory locations and provides the current values to the MetaServer. The MetaServer stores the new values and compares them with the previously stored values. When the new values are larger than the previously stored values, the target is assumed to be live. Otherwise the target is assumed to have failed.

One of two different trigger mechanisms for liveness checking may be implemented. The first, a push mechanism requires an internal timer be set at the target that signals the network interface at a particular frequency when to transmit the parameter values stored in the memory to the MetaServer. The second, a pull mechanism, involves the MetaServer periodically transmitting a request packet to the network interface of the specific target. The target then responds with a reply packet containing the parameter values.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
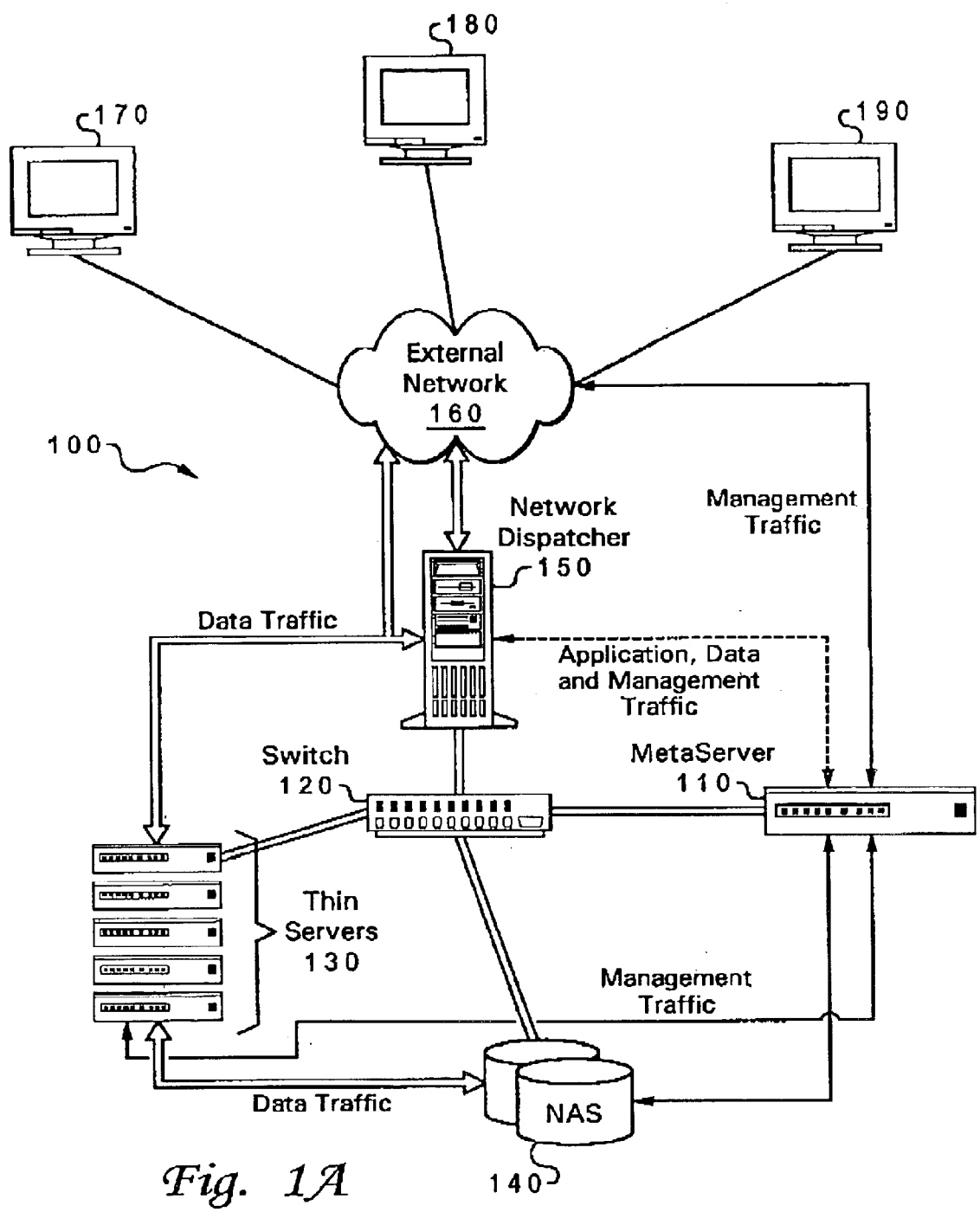
FIG. 1A depicts a block diagram of a MetaServer environment in which the present invention may be implemented.

With reference now to the figures and in particular with reference to FIG. 1A, a server farm environment having thin servers or server appliances that comprise a distributed data processing system is illustrated. The environment shown in the figure is referred to in this document variously as the MetaServer environment or as a cluster or farm of thin servers or server appliances.

The server farm environment includes a MetaServer 110 (i.e., a management server), a switch 120, one or more thin servers 130, network attached storage (NAS) 140, network dispatcher 150, external network 160, and one or more client devices 170–190. The MetaServer 110, switch 120, thin servers 130, NAS 140 and network dispatcher 150 are part of a local area network 100 coupled with the external network 160. In FIG. 1A, data flow is denoted by lines having arrow heads while actual physical connections are denoted by solid lines. In actuality, all data packets are routed through the switch 120.

The distributed data processing system shown in FIG. 1A is illustrative only. The particular architecture and elements shown in FIG. 1A are not intended to place any limitations on the architecture and elements used with the present invention. Rather, the distributed data processing system may have many other architectures and may include other elements in addition to, or in replacement of, the elements shown in FIG. 1A without departing from the spirit and scope of the present invention.

In the server farm environment of FIG. 1A, the thin servers 130 provide specialized applications to client devices 170–190 via the external network 160 and the network dispatcher 150. The thin servers 130 may provide any number of different applications, including print applications, database applications, web-serving applications, and the like.

The external network 160 may be any type of data network known to those of ordinary skill in the art. The external network 160 may be, for example, the Internet, an intranet, a wide area network (WAN), local area network (LAN), wireless data network, satellite data network, or the like. The external network 160 may also be any combination of the above.

The client devices 170–190 may be any type of computing device capable of accessing the thin servers 130 via the external network 160 and the network dispatcher 150. The client devices 170–190 may be, for example a personal computer, laptop computer, personal digital assistant (PDA), data network capable wireless communication device, and the like. The client devices 170–190 may access applications provided by the thin servers 130 using, for example, a web browser application or the like.

The network dispatcher 150 performs workload balancing with regard to the thin servers 130 with the goal being to avoid looking at every packet, especially every packet sent back by the thin servers 130. The network dispatcher 150 dispatches jobs or transaction requests to the thin servers 130 and the NAS 140. The network dispatcher 150 essentially provides a mechanism through which job or transaction requests may be sent to applications running on the thin server 130. The responses to these job or transaction requests are supplied directly by the thin servers 130 through the switch 120 to the external network 160 and hence to the clients 170–190.

The NAS 140 is a specialized file server that connects to the network. The NAS 140 uses traditional local area network (LAN) protocols, such as Ethernet and TCP/IP and processes only file I/O requests such as Network File System (NFS) (UNIX) and Server Message Block (SMB) (DOS/Windows).

The switch 120 is an electronic device that directs the flow of data from one side of the switch to the other. The switch 120 may be any type of data switching device known to those of ordinary skill in the art. For example, the switch 120 may be an Ethernet switch, a hub, a router, or the like. The switch 120 serves to route data and message traffic to appropriate devices 110, 130, 140 and 150.

The MetaServer 110 performs the function of managing the devices in the local area network (e.g., the switch 120, the thin servers 130, the NAS 140 and the network dispatcher 150. In managing these devices, what is meant is that the MetaServer 110 performs management functions including collecting data to maintain statistics of historical interest and to monitor the current state of the devices. The MetaServer 110 may be a server, as is generally known in the art, or may be a specialized thin server that is used to perform management functions. In the depicted example, the MetaServer 110 is a specialized thin server.

Figure 1B:
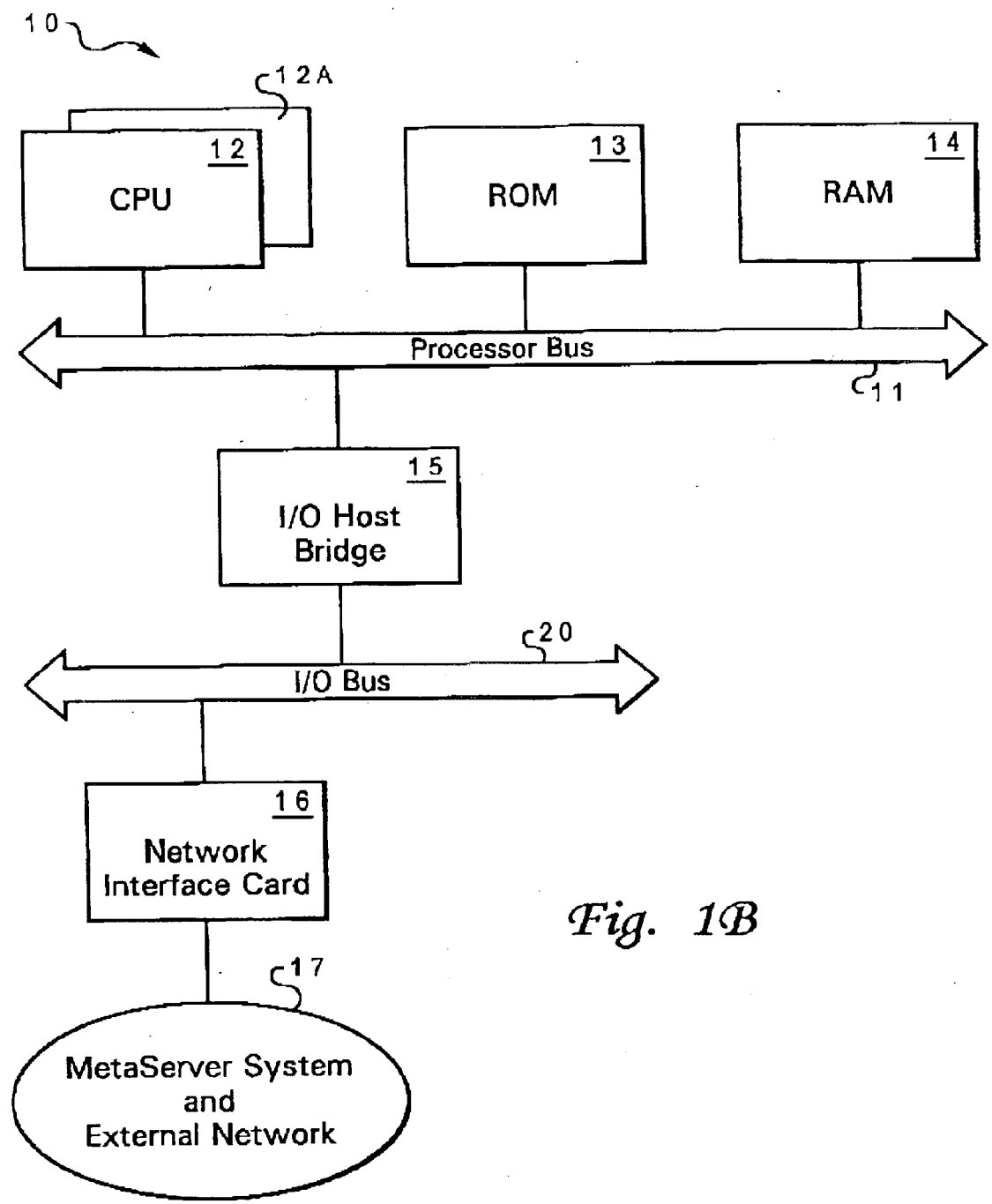
FIG. 1B is a block diagram representation of the component parts of a data processing system that may be utilized within a preferred embodiment of the invention.

Referring now to FIG. 1B, there is illustrated an exemplary embodiment of a thin server or server appliance, in which some features of the present invention may be implemented. The present invention may, however, be implemented in other types of computer system configurations that may be utilized as thin servers or server appliances. As shown, computer system 10, a thin server, has a processor (CPU) 12, a read-only memory (ROM) 13, and a read-write Random-Access Memory (RAM) 14 connected to a processor bus 11. Optionally, computer system also includes additional CPUs 12A. CPU 12, ROM 13, and RAM 14 are also coupled to Input/Output (I/O) bus 20 of computer system 10 through I/O host bridge 15. I/O host bridge 15 provides a low latency path through which processor 12 may directly access I/O devices mapped anywhere within bus memory or I/O address spaces. I/O host bridge 15 also provides a high bandwidth path for allowing I/O devices to directly access RAM 14.

Also attached to I/O bus 20 is network interface card (or logic) 16, collectively referred to hereinafter as network interface card. Network interface card 16 is of a programmable form and provides the function and hardware to connect computer system 10 to a network 17 such as the MetaServer environment described herein. Additional devices, including other bridged busses, may also be attached to I/O bus 20. In the preferred embodiment, each system of the MetaServer environment (i.e., the MetaServer and targets/servers) is implemented by a computer system 10 with associated programmable network interface card 16. Although not shown in FIG. 1B, each system is assumed to run a copy of an operating system (OS) as well as one or more application programs or servers.

Server systems that require system management often contain service processor cards with a standard microprocessor, local memory, and a standard bus interface. The present invention makes use of the programmable nature of programmable network interface card 16 to provide a simplified and low-overhead way of doing liveness detection in the MetaServer environment. The invention minimizes the overhead of liveness detection and consequently frees up computational and network resources for real application processing and other management services.

The present invention may be implemented in several different configurations of the MetaServer environment. The preferred embodiment of the invention is implemented in either a combined or a combined-and-repartitioned configuration that provides the service processor functions through hardware and software elements in the programmable network interface card 16.

In the combined configurations, the hardware and software redundancies that exist in the separate network interface card and service processor card of a server are merged into a unified programmable network interface card 16. To accomplish the monitoring and control functions of the service processor, the network interface card is provided with specific hardware connections to the other hardware components in the server such as, for example, direct access to the Inter-Integrated Circuit ($I^2C$) bus.

Further, the network interface card's primary function of providing access to the external network ensures that the service processor replacement already has a connector and cabling to the network. Thus, taking advantage of the features further enables the merged programmable network interface card to operate not only as a network interface, but also as a service processor, and the need for a separate connection to the network or another network is eliminated.

The functions that are programmed provide the current level of service processor function including gathering sensor data about the hardware, forwarding alerts regarding hardware state, initiating shutdown and restart on command, and responding to operating system service processor inquiries and commands.

Figure 2:
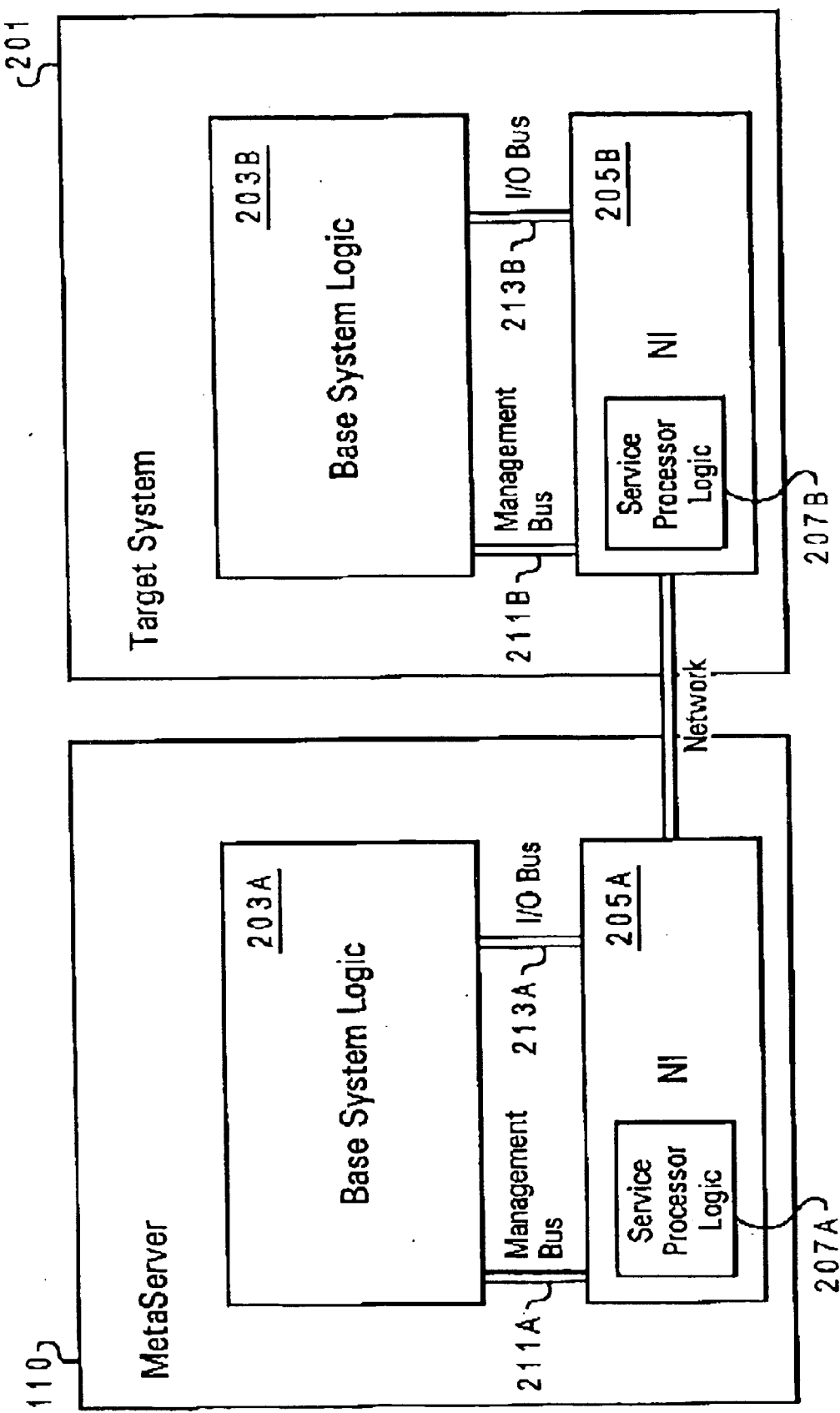
FIG. 2 illustrates a block diagram of the combined service processor and network interface logic within the programmable network interface card within a MetaServer and a target system in accordance with one implementation of the present invention.

FIG. 2 illustrates the combined service processor-network interface embodiment. Both a management server appliance or MetaServer 101 and a target managed system 201 are illustrated. MetaServer 101 and target managed system 201 respectively are comprised of base system logic 203A, 203B and a network interface 205A, 205B within which is programmed the service processor logic 207A, 207B. Network interfaces 205A, 205B are connected to base system logic 203A, 203B via management busses 211A, 211B and I/O busses 213A, 213B. Network interface 205A is connected to the network interface 205B through standard network connection technology 209 such as an ethernet switch. The details of connection technology 209 vary depending on the nature of the network interfaces 205A, 205B used.

Thus, rather than having separate implementations of the network interface logic and the service processor logic, the invention combines the features of both components into a single implementation utilizing a single processor, single memory, single software structure and a single set of network connections and signaling logic. The combined implementation has a single implementation of the hardware and software to power the servers on and off as well as a single interface to the software that runs on the main processor(s) of each server.

In order to provide all of the function required by standard specifications such as Intel's Wired for Management 2.0 and the related Intelligent Platform Management Interface Specification, the present invention revises some network interface connections to server logic. In particular, the programmable network interface card (or functional equivalent) is provided with a connection to the management bus on the server planar such as, for example, the Intelligent Platform Management Bus, which is the extended $I^2C$ bus for management specified by the Intel standards.

In a second embodiment, rather than combining all of the network interface and service processor logic into a single logic element, two separate blocks of programmable logic are maintained (i.e., the logic blocks are re-partitioned). One block of logic is dedicated solely to the network interface and another block is dedicated to service-processor-related monitoring and control functions. In the re-partitioned embodiment, all of the external interface and network-related functions found in current service processor implementations are moved to the network interface logic while management-related functions such as the system start-up, invoked by wake-on-LAN, are moved to the service processor logic.

Figure 3:
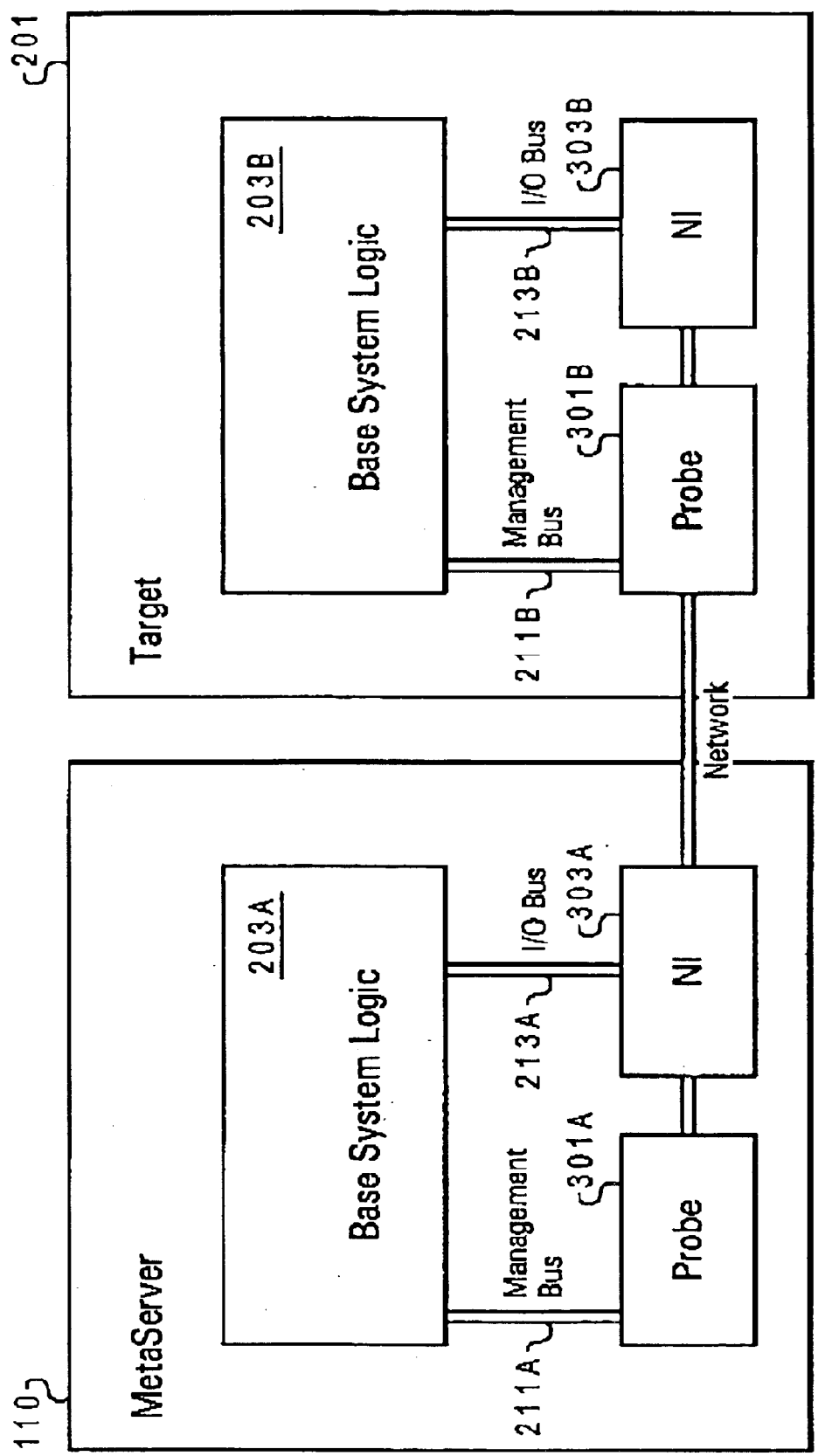
FIG. 3 illustrates a block diagram of the re-partitioned functions of a service processor and a network interface of a programmable network interface card according to a next implementation of the present invention.

FIG. 3 illustrates one implementation of the re-partitioned logic blocks. The FIG. 3 components that are similar to FIG. 2 have been previously described above. Single network interfaces 205A, 205B of FIG. 2 are replaced with separate service processor logic (or probe) 301A, 301B and network interface logic 303A, 303B. With the re-partitioned embodiment, management busses 211A, 211B connect to probes 301A, 301B, while I/O busses 213A, 213B connect to network interfaces 303A, 303B. Probes 301A, 301B and network interfaces 303A, 303B are interconnected within MetaServer 110 and target managed server 201, respectively.

The probes 301A, 301B illustrated in FIG. 3 are not, or at least, may not necessarily be, a full service processor implementation minus the networking function. In one embodiment, the probes 301A, 301B are simple controllers that acts as local monitoring and control points within each server.

The present invention makes use of the fact that each of the targets and the MetaServer includes a programmable network interface card. The invention provides a simple, low-overhead liveness detection protocol for the MetaServer environment. The protocol of the present invention is restricted to liveness and perhaps overall system loading rather than to determining whether the application service is processing transactions successfully. Therefore, progress is determined at a server, rather than an application level in the preferred embodiment.

Among the available features, each programmable network interface is assumed to have a way of memory-mapping the main memory of the associated server and can also access the internal state of the associated server. Then, during initiation of the target server, in the preferred embodiment, the operating system reserves an area of memory that is passed as a shared area to the device driver for the programmable network interface. During normal operation of the target server, the values in the reserved/shared area are incremented periodically.

Periodically, one or more of the values in the memory area are incremented. Incrementing the value or values may be triggered by an internal state that is reached by the operating system, the execution of a specialized daemon process, or the execution of logic in an application service when it reaches a particular internal state. In the preferred embodiment, when internal states are utilized, the internal states chosen are ones that the programs pass through at relatively predictable and frequent intervals and indicate the completion of current work or the initiation of new work. For example, if an internal clock tick count is utilized to monitor liveness, the clock tick count is recorded in the reserved/shared memory area at initialization of the target server, and an updated clock tick count is recorded in the reserved/shared memory area after a period of time has passed based on a pre-selected time interval.

A set of pre-defined variables may be utilized to represent the target servers and associated parameter values. For example, assuming $T_0$, $T_1$, $T_2$, ..., $T_{k-1}$ are target servers managed by MetaServer, M, and assuming $VT_0$, $VT_1$, $VT_2$, ..., $VT_{k-1}$ are the variables or sets of variables shared between the targets and their network interfaces, then M requires a shared variable set VM of the form $\{VT_0, VT_1, VT_2, ..., VT_{k-1}\}$ where, if the $VT_1$ are sets of variables, VM contains the variables themselves rather than the sets. On each $T_i$, the shared variable or set of shared variables is $VT_i$.

Figure 4:
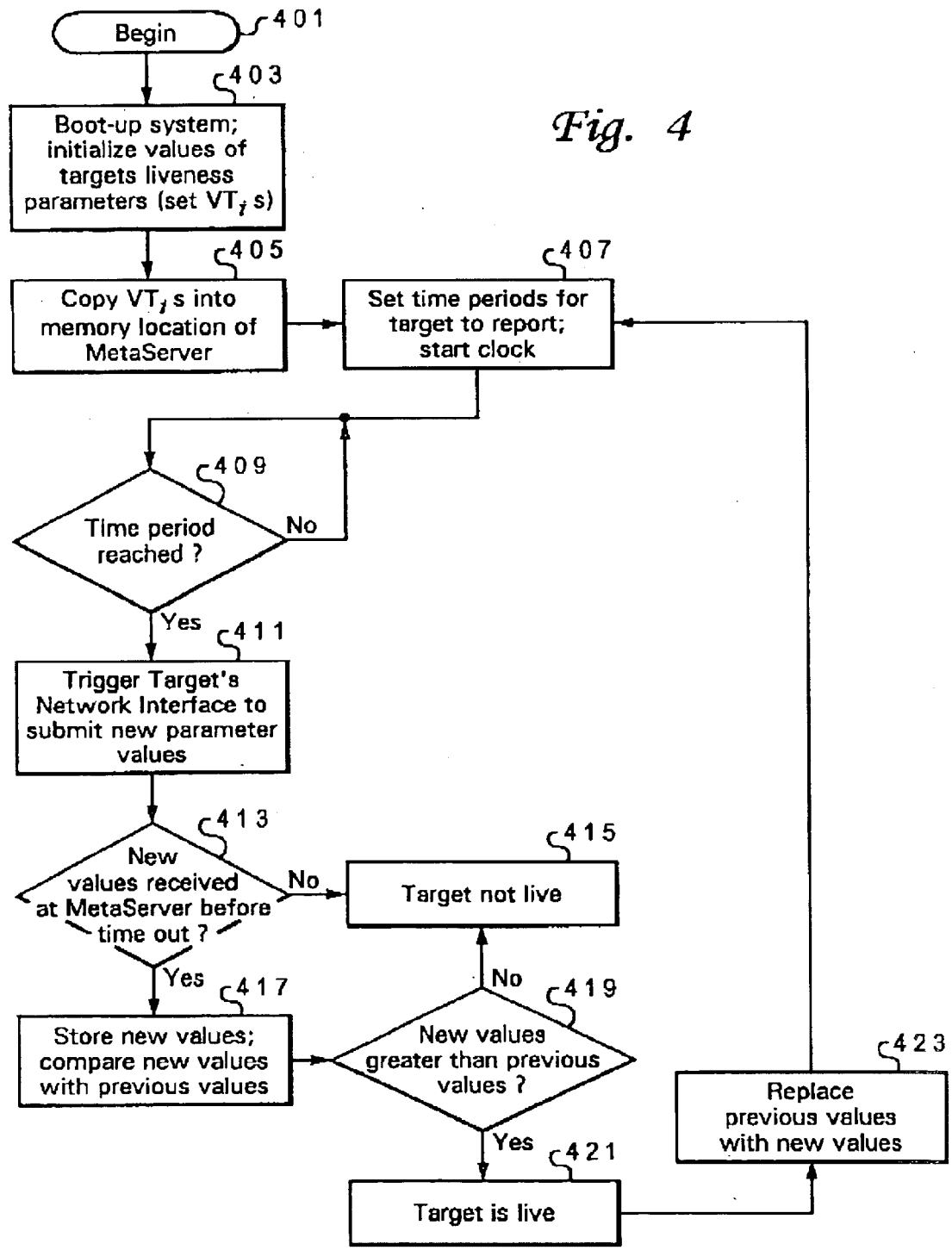
FIG. 4 is a flow chart illustrating the process of detecting liveness of a system within the MetaServer environment in accordance with an embodiment of the invention.

Referring now to FIG. 4, there is illustrated a flow chart of the process for liveness detection according to a preferred embodiment. The process begins at block 401. M is physically connected on the same physical network as all of the targets that it manages. When the target $T_i$ is booted by the MetaServer and has completed its initialization, one of the trigger mechanisms described below causes the network interface to deliver an initial value or set of values for $VT_1$ as illustrated in block 403. On arrival, the network interface of the MetaServer interrupts the main processor of the MetaServer, and the values, denoted $PVT_1$, are copied into one or more memory locations within the MetaServer at block 405. The MetaServer determines the liveness of each of the targets individually. A time period is set for the targets to report liveness statistics at block 407, and then a determination is made at block 409, whether the associated time interval has elapsed. No action is taken if the time period has not elapsed; however, if the time period has elapsed, $T_i$'s network interface is triggered to transmit a special frame to M's network interface, as illustrated in block 411. The frame contains the current value or values of $VT_1$. The operation is dependent only upon the proper operation of the network interface and connection and not on whether $T_i$ is currently making forward progress. In the preferred embodiment, a MAC-level frame is utilized to send the information and is transmitted via MAC address to the network interface of M.

Returning to FIG. 4, a check is made at block 413 whether new parameter values have arrived at M before a pre-defined time-out interval (TOI) has elapsed. When the new values are not delivered within the TOI, $T_i$ is declared to be "not live" as shown in block 415. When the delivery of a new value or set of values for $VT_1$ occurs within the TOI, the network interface again interrupts the MetaServer's processor, and the new values, denoted $NVT_i$ are copied to a separate location or locations of the MetaServer's main memory as shown in block 417. Then, a comparison is completed by which the liveness of the individual target $T_1$ is determined at block 419. The comparison checks whether the value or values of $NVT_i$ received are greater than the value or values of $PVT_i$.

In the preferred embodiment, the comparison determines that the greater-than relationship is true if and only if at least one of the elements of $NVT_i$ is strictly greater than the corresponding element of $PVT_i$ and all of the other values are greater than or equal to their corresponding elements. Accordingly, the algorithm assumes that all the elements of $VT_i$ are monotonically increasing.

If the greater-than relationship holds, the target server is classified as being live as illustrated at block 421. Otherwise, it is presumed "not live" as shown at block 415, which may then trigger a more intensive analysis of the particular target. If $T_i$ is live, then the value or values of $NVT_i$ are copied to $PVT_i$ at block 423, and the algorithm iterates.

Two possible trigger mechanisms are provided. The first trigger mechanism, the push mechanism, utilizes an internal timer on the programmable network interface in the target sever that is set to generate an interrupt periodically, with period P, within the network interface. Every P ticks, the interrupt causes the network interface to transmit the shared variables to the MetaServer. In the preferred embodiment, the time P*T, where T is the internal network interface tick length, is made a multiple of the expected intervals at which the monitored variables are updated by the main processor to avoid spurious liveness failures. Also, to avoid network packet storms, the actual transmission times utilized by the $T_i$ are preferably de-synchronized. In one embodiment, the transmission times for the $T_i$s are initially skewed by a command frame from the MetaServer network interface.

The second trigger mechanism, the pull mechanism, transmits the $VT_i$ value or values in response to the receipt of a frame from the MetaServer system indicating a request for a liveness check. Again, to avoid packet storms, the MetaServer polls each system individually rather than broadcasting a poll. As above, the poll interval is selected to be long enough to avoid false reports of target failure. Finally, the measured parameters utilized to provide the value or values included in each $VT_i$ are decided by a designer at design-time based on the type of target and what exhibited characteristics would best indicate the target's liveness.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal-bearing media include recordable media such as floppy disks, hard disk drives, CD ROMs, and transmission media such as digital and analog communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system comprising:
   a target server with a first programmable network interface card that includes programmed logic for localized detection of liveness of said target server via at least one liveness parameter that is maintained local to said target server, said target server being associated with a server farm network; and
   a management server connected to said target server via the server farm network, said management server having a second programmable network interface card that includes programmed logic for receiving, from the first programmable network interface of the target server, the liveness parameter from the target server and determining, based on a value of said liveness parameter whether the target server is operational within the server farm network, wherein said server farm network is managed by the management server and said server farm network is separate from an external data network for connecting client systems to said server farm network.

2. The system of claim 1, wherein:
   said first programmable network interface includes logic for:
      signaling an operating system of the target server to complete a boot-up process and liveness check activation of said target server responsive to receipt of a boot-up trigger from the second programmable network interface; and
      retrieving local values of the liveness parameter from the target server and forwarding the retrieved liveness parameter values to said second programmable network interface; and
   said second programmable network interface of said management server comprises logic for:
      transmitting a boot-up message to said first programmable network interface to initiate a boot up of said target server wherein said first programmable network interface responds by returning an initial value of the liveness parameter;
      passing said initial value received for storage in a memory location of the management server; and
      setting a time out interval and frequency count at said management server for receipt of a next liveness parameter value from said target server, wherein said target server is determined to be live when a next liveness parameter is received at the management server prior to expiration of said time out interval.

3. The system of claim 1, wherein said logic of said second programmable network interface card further includes:
   logic for initiating transmittal of said first value of said liveness parameter from said first programmable network interface card at boot-up and
   logic for storing said first value at said first location of memory.

4. The system of claim 3, wherein said management server further comprises logic for triggering a delivery of said next value from said first programmable network interface card.

5. The system of claim 4, wherein said triggering logic includes logic for transmitting a liveness query frame to said first programmable network interface card, wherein said liveness query frame is a special frame that requests a liveness check from the recipient of the frame and wherein said first programmable network interface card includes logic for identifying said liveness query frame as requesting transmittal of a next liveness parameter value.

6. The system of claim 5, wherein said triggering logic includes a timer that determines a time when said frame is to be transmitted.

7. The system of claim 6, wherein said frame is a MAC-level frame and said next value is returned by said first programmable network interface card in a corresponding MAC level frame to a MAC address of said management server.

8. The system of claim 4, wherein said management server farther comprises logic for:
   comparing said next value with a present value stored at a first location of management server memory to determine if said target server is live, wherein said target server is live if the next value is greater than the present stored value; and
   replacing the present value with said next value in said management server memory location when said target server is live.

9. The system of claim 8, wherein said first programmable network interface card includes triggering logic that comprises a timer, which determines a time when said frame is to be transmitted by said first programmable network interface card based on a pre-determined frequency.

10. The system of claim 9, wherein said target server further comprises logic for:
    setting an initial value of said liveness parameter at said boot-up;
    updating said initial value to said next value at a set frequency when internal processes of said target server are operational; and
    transmitting said value to said second programmable network interface card whenever said triggering logic activates.

11. The system of claim 10, wherein said predetermined frequency is set to a time corresponding to a period during which said target is able to update to said next value of said liveness parameter.

12. The system of claim 12, wherein said management server further comprises logic for determining when said next value is not received within a time-out interval and in response, tagging said target server as not live.

13. A method of detecting liveness of a target server by a management server within a server farm network, said method comprising:
    triggering a boot-up of the target server from the management server via a special boot-up message transmitted from a first programmable network interface card (PNIC) of the management server to a second programmable network interface card (PNIC) of the target server, wherein said second PNIC is programmed to initialize a first value of an updatable liveness parameter associated with said target server and forward said first value and subsequent values of said liveness parameter to said first PNIC of the management server;
    storing the first value of said liveness parameter in memory of the management server when said first value is received;

receiving a first of said subsequent values from said second PNIC;

dynamically determining at the management server if said target server is live by comparing said first of said subsequent values with said first value;

replacing said first value with said subsequent value when said target server is live; and periodically checking a liveness of said target server by checking a stored value at said management server with a next subsequent value received from the target server.

14. The method of claim 13, wherein said determining comprises comparing said first value with said new value that is generated after a pre-determined period has elapsed, wherein said target server is live when said new value is greater than said first value.

15. The method of claim 14, further comprising triggering a first programmable network interface card of said target server to forward said initial and new value to a second programmable network interface card of said management server at a pre-determined period, wherein said new value is automatically updated at said target server when a processor of said target server is operating.

16. The method of claim 15, farther comprising triggering said incrementing step via execution of a specialized daemon process.

17. The method of claim 15, farther comprising triggering said incrementing step at said target via execution of logic within an application when said application reaches a particular internal state.

18. The method of claim 17, wherein said triggering includes transmitting a frame from said first programmable network interface card of said target server to said second programmable network interface card of said management server, said frame containing the new value.

19. The method of claim 18, wherein said frame is a MAC-level frame, said method comprising addressing said frame to said network interface of said management server.

20. The method of claim 19, further comprising copying said new value into said first location of memory when said new value is greater than said first value, wherein said new value is greater if each element of said new value is greater than or equal to corresponding elements of said first value and at least one element of said new value is greater than a corresponding element of said first value.

21. The method of claim 20, further comprising:

monitoring a pre-selected time-out interval for receipt of said new parameter values; and tagging said target server as failed when said new value is not received within said time interval.

22. The method of claim 21, wherein said server farm network comprises multiple target servers, said method further comprising staggering a period for transmission of said new value from each target server among said multiple target servers.

23. The method of claim 22, further including transmitting a liveness frame to said target server from said management server requesting return of said new value, wherein said liveness frame triggers said first programmable network interface card to submit said new value to said management server.

24. The method of claim 23, wherein said server farm network comprises multiple target servers, said method further comprising staggering a period for transmission of said frames to each target server among said multiple target servers.

* * * * *

UNITED STATES PATENT AND TRADEMARK OFFICE
CERTIFICATE OF CORRECTION

PATENT NO. : 6,823,397 B2 Page 1 of 1
APPLICATION NO. : 09/738578
DATED : November 23, 2004
INVENTOR(S) : Freeman L. Rawson, III It is certified that error appears in the above-identified patent and that said Letters Patent is hereby corrected as shown below:

In column 10, line 46, delete "12," and insert --10,--.

Signed and Sealed this

Eighth Day of January, 2008

JON W. DUDAS
*Director of the United States Patent and Trademark Office*